US010861017B2

(12) United States Patent
Borucki

(10) Patent No.: US 10,861,017 B2
(45) Date of Patent: Dec. 8, 2020

(54) BIOMETRIC INDEX LINKING AND PROCESSING

(71) Applicant: NCR Corporation, Duluth, GA (US)

(72) Inventor: Robert Thomas Borucki, Scottsdale, AZ (US)

(73) Assignee: NCR Corporation, Atlanta, GA (US)

(*) Notice: Subject to any disclaimer, the term of this patent is extended or adjusted under 35 U.S.C. 154(b) by 255 days.

(21) Appl. No.: 15/940,874

(22) Filed: Mar. 29, 2018

(65) Prior Publication Data

US 2019/0303944 A1 Oct. 3, 2019

(51) Int. Cl.
*G06Q 20/40* (2012.01)
*H04L 29/06* (2006.01)

(52) U.S. Cl.
CPC ... *G06Q 20/40145* (2013.01); *H04L 63/0861* (2013.01); *H04L 63/0869* (2013.01)

(58) Field of Classification Search
CPC .......... G06Q 20/40145; G06Q 20/206; G06Q 20/385; G06Q 20/202; G06Q 20/204; G06Q 20/3821; H04L 63/0869; H04L 63/0861
See application file for complete search history.

(56) References Cited

U.S. PATENT DOCUMENTS

| 6,505,193 | B1* | 1/2003 | Musgrave | H04L 9/3263 |
| 7,127,088 | B1* | 10/2006 | Grajewski | G06F 21/34 382/124 |
| 7,398,549 | B2* | 7/2008 | Ting | G06F 21/32 382/116 |
| 7,702,918 | B2* | 4/2010 | Tattan | G06F 21/32 713/186 |
| 8,887,259 | B1* | 11/2014 | Harding | G06F 21/6254 713/185 |
| 10,083,444 | B1* | 9/2018 | Schneider | G06Q 20/206 |
| 2004/0123114 | A1* | 6/2004 | McGowan | G07F 7/1008 713/186 |
| 2004/0260657 | A1* | 12/2004 | Cockerham | G06F 21/31 705/76 |
| 2006/0034494 | A1* | 2/2006 | Holloran | H04L 9/32 382/116 |
| 2007/0052517 | A1* | 3/2007 | Bishop | G06Q 20/10 340/5.2 |
| 2007/0079136 | A1* | 4/2007 | Vishik | G06Q 20/0855 713/186 |
| 2007/0115940 | A1* | 5/2007 | Kamen | H04L 63/0861 370/352 |
| 2009/0049298 | A1* | 2/2009 | Hatter | H04L 9/321 713/176 |

(Continued)

*Primary Examiner* — Matthew Smithers
(74) *Attorney, Agent, or Firm* — Schwegman, Lundberg & Woessner

(57) ABSTRACT

Biometric templates are created for biometric data captured for a user. Each template is processed to generate a unique token. Each template and token pair is stored in a record of an index along with a link to at least one an external service of the user. During a transaction at a transaction terminal, biometric data for a user is captured and a template is generated. The index is searched with the template to obtain a corresponding token and a link to the external service. The external service is provided the token to identify the user and return personal data for the user from an account of the user with the external service. The personal data is processed for the transaction at the transaction terminal.

13 Claims, 4 Drawing Sheets

(56) References Cited

U.S. PATENT DOCUMENTS

| | | | | |
|---|---|---|---|---|
| 2011/0126024 A1* | 5/2011 | Beatson | ................... | G06F 21/32 |
| | | | | 713/186 |
| 2012/0028609 A1* | 2/2012 | Hruska | ................. | H04L 63/083 |
| | | | | 455/411 |
| 2012/0323735 A1* | 12/2012 | Montero | ................ | G06Q 20/02 |
| | | | | 705/26.41 |
| 2014/0074725 A1* | 3/2014 | Belamant | ............ | G06Q 20/385 |
| | | | | 705/72 |
| 2014/0195815 A1* | 7/2014 | Taveau | ................... | G06F 21/32 |
| | | | | 713/186 |
| 2015/0058220 A1* | 2/2015 | Cazanas | ................ | G06Q 20/40 |
| | | | | 705/44 |
| 2016/0063313 A1* | 3/2016 | Sandholm | .............. | H04L 9/3231 |
| | | | | 382/118 |
| 2019/0243956 A1* | 8/2019 | Sheets | ................... | G06F 16/903 |
| 2019/0318361 A1* | 10/2019 | Hurst | ................... | G06Q 20/383 |
| 2019/0364039 A1* | 11/2019 | Chandrasekaran | ......................... | |
| | | | | H04L 63/0861 |

\* cited by examiner

BIOMETRIC INDEX LINKING AND PROCESSING

BACKGROUND

Security is of utmost concern in the industry. Enterprise services are constantly under siege for hackers, some of which may reside in hostile nations to the home nations of the enterprise. Consequently, enterprises are regularly changing and updating user authentication techniques to guard against these attacks.

Consumers/users of the enterprise services have multiple different accounts with different enterprises for different services. Often, the accounts include different authentication requirements and the consumers will use different user identifiers and user credentials for each of these different accounts. As a result, consumers often forget specific authentication requirements to access their accounts, this is especially true for infrequently used consumer services.

This situation also means that confidential account information for a single consumer is often accessible online from a variety of disparate and geographically dispersed databases.

In general, the industry believes biometric authentication to be a stronger form of security and certainly much strong than traditional user identifier and password pairs or user challenge and response approaches. However, many of the existing enterprise services available in the industry are not equipped (hardware and software) to handle biometric authentication. Those enterprises that do provide biometric authentication often include proprietary biometric approaches that are not compatible with one another.

The end result is that a consumer is faced with a plethora of different authentication techniques that the consumer is forced to recall to access their services. Furthermore, enterprises cannot offer services to the consumer between disparate enterprise devices that the consumer accesses without forcing the consumer to perform enterprise-specific authentication for each enterprise that consumer is attempting to access from the enterprise devices.

SUMMARY

In various embodiments, methods and a system for biometric index linking and processing are presented.

According to an embodiment, a method for biometric index linking and processing is presented. More particularly, a biometric template is identified for a user. An index is searched with the biometric template to obtain a token that identifies the user and a link to an external service. The token is provided to the external service utilizing the link. Finally, personal data associated with the user is obtained from the external service for processing during a transaction by the user at a transaction terminal.

DETAILED DESCRIPTION

Figure 1:
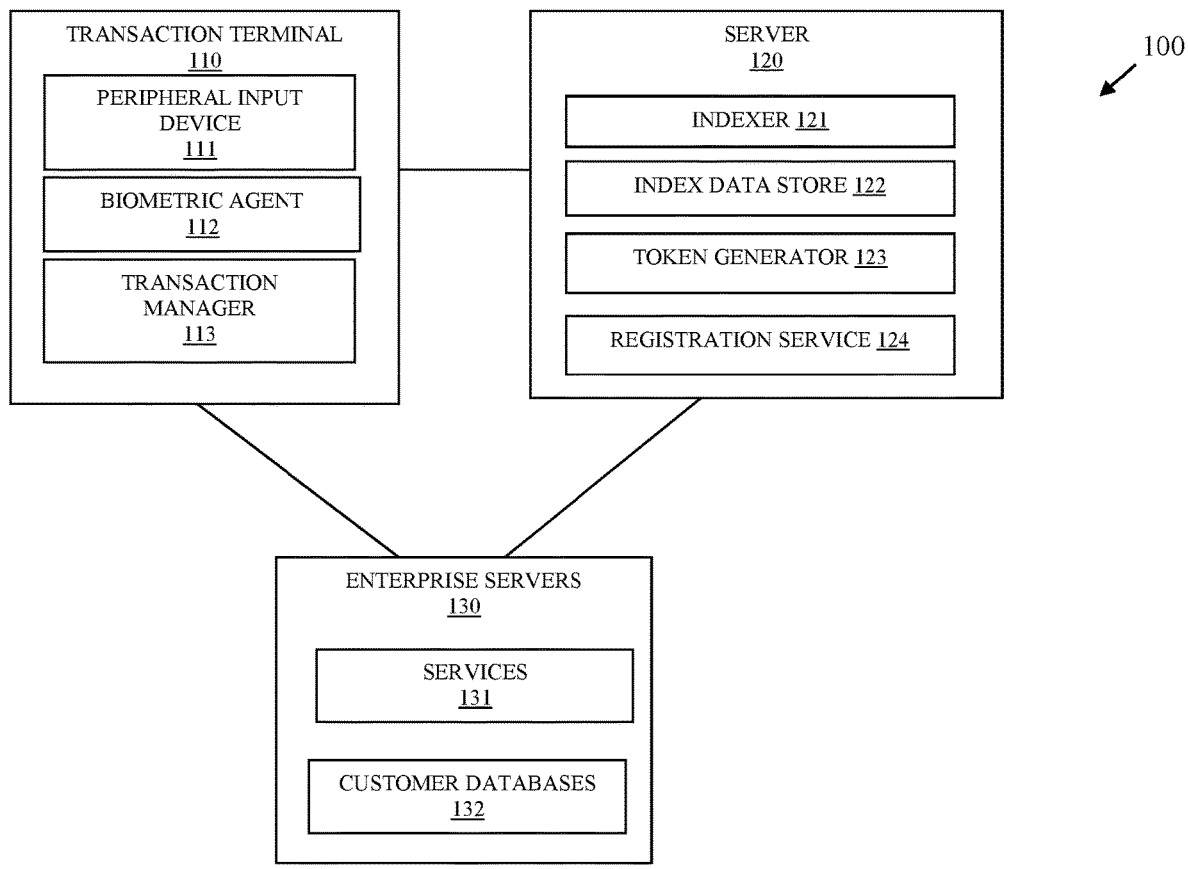
FIG. 1 is a diagram of a system for biometric index linking and processing, according to an example embodiment.

FIG. 1 is a diagram of a system 100 for biometric index linking and processing. The various components are illustrated and the arrangement of the components is presented for purposes of illustration only. It is to be noted that other arrangements with more or fewer components are possible without departing from the biometric index linking and processing teachings presented herein and below.

The techniques, methods, and system presented herein and below for biometric index linking and processing can be implemented in whole or in part in one, all, or some combination of the components shown with the system 100. The techniques and methods are programmed as executable instructions in memory and/or non-transitory computer-readable storage media and processed on one or more processors associated with the various components.

As used herein the terms "customer," "consumer," and "user" may be used synonymously and interchangeably.

"Biometric data" or "Biometric information" includes electronically captured data from physical attributes of a user, such as but not limited to: facial features captured in an image of a face of a user; iris features captured through a scan of the user's eye; fingerprint features captured by a fingerprint reader, a scanner, or an imaging device; distance measurements between selective digits of the user calculated from a scan or image of a user's hand; voice patterns captured by a speaker for a voice of the user; and others.

A "token" as used herein, refers to a Globally Unique Identifier (GUID) or calculated unique value generated and assigned to a specific user after biometric registration. It is noted that the GUID can be a unique range of values associated to a specific user and does not have to be a single value.

The system 100 includes a transaction terminal 110 having at least one peripheral input device 111, a biometric agent 112, and a transaction manager 113.

The system 110 also includes a server having an indexer 121, an index data store 122, a token generator 123, and a registration service 124.

The system 110 further includes a plurality of geographically dispersed enterprise servers 130 having enterprise services 131 and customer databases 132.

Initially, a user registered for participating in the cross-linking authentication services offered by the system 100. During registration, biometric data is then captured for the user through the peripheral input device 111 of the transaction terminal 110. This can be for a specific type of biometric data (face, voice, finger, eye, etc.) or a combination of types (face, voice, finger, and/or eye). Multiple readings for each or several types of biometric data may be captured by the peripheral input device 111 during the registration. Both of the biometric agent 112 and/or the token generator 123 produce one or more templates from the captured biometric data; each biometric data type(s) produces a unique template from the biometric data and the type(s). Each template is then provided to the generator 123 by the registration service 124 and a unique token for each template is generated through a hashing mechanism.

In an embodiment, a template is set of sampled and/or hashed data values obtained from specific points or areas of captured biometric data.

The registration service 124 then generates a unique record within the data store 122 for each template and token. Each template serving as a key for searching the data store 122 (also referred to as index 122 herein and below).

In an embodiment, the user is asked which services 131 that the user desires to link to the cross-linking authentication and cross-linking personably identifiable accounts services provided by the system 100. The user then provides through the transaction manager 113 and the registration service 124 an account or some uniquely identifiable information used by the selected services 131 to unique identify accounts of the user in the databases 132 maintained by the services 131, for example an email for the user or an account number. Each record for each template and token combination in the data store 122 (may also be referred to as index 122 herein) is then updated to include an identifier for the selected service 131 and the unique identifiable information used by the user for identifying the user to that service 131.

In an embodiment, the registration service 124 is called from a registration service or an account settings update service of the services 131. Here, the user is registering for the service 131 and/or updating an account of the user to include the cross-linking authentication and cross-linking personably identifiable accounts services provided by the system 100. Such, that only the user's biometric templates and corresponding token are stored in the index 122.

In another embodiment and during registration, the user provides (through software interfaces to the registration service 124) personably identifiable information for the user, such as: name, address, birthdate, email address, etc. The registration service 124 includes the personably identifiable information for the user in each record for each template and token pair in the index 122.

At this point the user has an account with the system 100, identified through the one or more records generated and stored in the index 122.

In an embodiment, the biometric agent 112 is configured to generate the template(s) 112 from the biometric data and provide the generated template to the token generator 123. The token generator 123 hashes the template to produce/generate the token(s). Each template and token pair representing a unique record in the index 122. Multiple records for a same user are in the index 122 and are cross-referenceable.

In an embodiment, the transaction manager 113 provides the user with a list of available services 131 that the indexer 121 has cross-linking capabilities with through Application Programming Interfaces (APIs) maintained by the indexer 121 and each of the participating services 131; allowing for two-way communication; reliance on any presented token by indexer 121; and accessing user accounts maintained with the services 131. The enterprise services 131 maintain an authenticated and trusted online relationship with the indexer 121. The user makes selections of the services 131 and the registration service updates the user's record with links from the record in the data store 122 for the user to the selected services 131. The transaction manager 113 may also request at least a user's identifier or account for each of the selected services 131, which is also updated to the user's account record within the data store 122 by the registration service 124. The indexer 121 through the registration service 124 and interaction with the transaction manager 131 obtains at least enough unique customer information so that each of the selected services 131 can identify the user's accounts with those services 131 during the registration process.

In an embodiment, the indexer 121 provides scrape feature. In the scrapping feature, the indexer 121 and the individual services 131 do not maintain and are not preconfigured to interact with one another. Rather, the indexer 121 includes an API for each online interface of each of the services 131 that permits the indexer 121 to connect to the services 131 using existing user credentials of the user. The indexer 121 is believed to be and appears to be the user to the services 131. In this embodiment, and during registration, the user provides through the transaction manager 113 the credentials used by the user for accessing each of the user's accounts with each of the user's selected services 131. This credentialing information can be encrypted and also stored in the user's account record being maintained in the data store 122 by the registration service 124.

In an embodiment, the registration service 124 does not require any personable identifiable information during registration; rather, the information provided for linking the selected services 131 is obtained during the registration as noted above and used for the cross-linking authentication and access to the personably-identifiable information of the user maintained in the databases 132 for those services 131. Here, as stated before the index 122 only includes the templates and corresponding tokens and links to the services 131.

In an embodiment and during registration, the registration service 124 provides a link that is presented by transaction manager 113 on the display of the terminal 110. The link when activated asks the user to log in to each service 131 selected by the user for linkage. A modified interface of the service recognizes the redirection from the registration service 124 and after user successful login obtains the tokens for the templates and updates the user's account in the database 132 to include the tokens.

Once registration is completed, the indexer 121 has one or more biometric templates that are used as keys for accessing the index 122 and obtain a unique token that identifies the user only with a link to the user's participating services 131. Each of the selected services 131 maintaining the user's accounts in their own proprietary customer database 132.

The user is ready to realize the full benefits of the system 100 with cross-linking authentication to disparate services 131 of the user during any subsequent transaction that the user has with a transaction terminal 110.

For example, a user is performing a post-registration security check-in with a TSA (U.S. Transportation Security Agent) agent that operates a transaction terminal 110. A camera 111 captures an image of the user's face. The biometric agent 112 generates a template from the captured biometric data in the image, or the biometric agent provides the image to the generator 123 for generation of the template. The indexer 121 uses the template as search criteria for searching the index 122 and obtains the corresponding token and reference to an airline loyalty service 131. The token is provided to the transaction manager 113, the transaction manager uses an API of the airline service 131 and makes a request for the needed personably identifiable information (an image of a driver's license) and provides the token. An API of the airline service 131 uses the token to search the customer database 132 and authenticate the user for access to the user's account. The driver's license is returned from the account by the airline service 131. The transaction manager 113 displays the image of the driver's license for the user on a display of the transaction terminal 110. The TSA agent confirms that the user is who is in front of the agent attempting to pass the security checkpoint. All this can be achieved without any action of the user other than the user being within the field-of-view of the camera 111 interfaced to the transaction terminal 110.

The above example can be processed in a variety of other manners that correspond to the various embodiments presented above. For example, the indexer 121 can scrap the interfaces of the airline service for the driver's license with the user credentials as discussed above where the indexer 121 logs on to the airline service 121 with the user's credentials as the user. In another case, a unique identifier for the user (included in the index 122 for account cross-linking with the token) along with a security assertion provided by the indexer 121 is relied upon as authentication for the user by the airline service 131 to access the account and provide the driver's license back to either the transaction manager 113 and/or the indexer 121 (which then provides the image of the driver's license to the transaction manager 113).

Cross-linking and authentication is achieved through generation of biometric templates for a user based on captured biometric data by the peripheral input device 111. The templates can be generated by the biometric agent 112 on the transaction terminal 110 or by the token generator 123. In either case, the template is provided to the token generator 123 for hashing to produce a unique token. Each template and token pair are indexed as records within the index 122 by the indexer 122 to unique identify a user's account record. The account record provides the linkages for the indexer 121 to access personably identifiable information of the user in user accounts of the customer databases 132 maintained by the services 131. The transaction manager 113 provides access to the cross-linked personably identifiable information during a transaction at the transaction terminal 110. The cross-linked personably identifiable information may be provided as imaged information on a display of the terminal 110 during the transaction or provided as electronic information (name, birthdate, address, email, and/or account number), needed for processing during the transaction.

In an embodiment, the services 131 during a registration with the services 131 ask the user whether the user desires to participate in the cross-linking authentication and account access. The services 131 use the token generator 123 for providing user unique tokens for the biometric templates generated during the registration by the biometric agent 112. The user's account is then updated with the tokens provided by the token generator 123 during registration of the user with the service 131. The services 131 are further configured to process subsequent generated templates by the biometric agent 112 to consult the indexer 121 for providing a token and using the token to access the user's account in the database 132.

In an embodiment, the processing of the indexer 122, token generator 123 and registration service 124 are subsumed in interfaces of the services 131.

In an embodiment, the transaction terminal is one of: a Point-Of-Sale (POS) terminal, a Self-Service terminal (SST), a kiosk, or an ATM.

In an embodiment, the server 120 is a cloud processing environment.

In an embodiment, the peripheral device 111 is one of: a camera, a speaker, a fingerprint reader/scanner, and an iris scanner.

These embodiments and other embodiments are now discussed with reference to the FIGS. 2-4.

Figure 2:
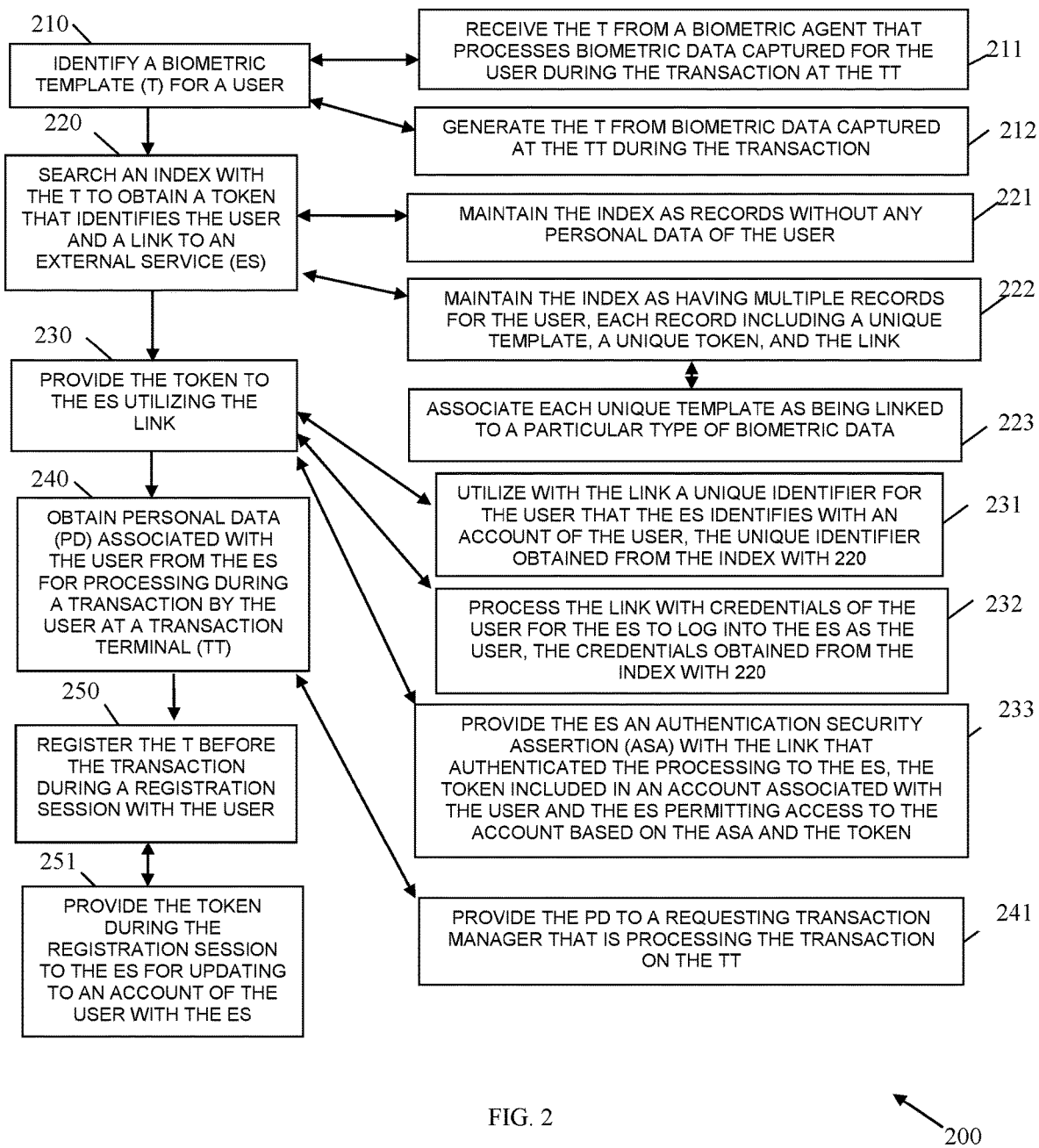
FIG. 2 is a diagram of a method for biometric index linking and processing, according to an example embodiment.

FIG. 2 is a diagram of a method 200 for biometric index linking and processing, according to an example embodiment. The software module(s) that implements the method 200 is referred to as an "indexer." The indexer is implemented as executable instructions programmed and residing within memory and/or a non-transitory computer-readable (processor-readable) storage medium and executed by one or more processors of a device. The processor(s) of the device that executes the indexer are specifically configured and programmed to process the index. The index manager has access to one or more networks during its processing. The networks can be wired, wireless, or a combination of wired and wireless.

In an embodiment, the indexer is all or some combination of: the indexer 121, the token generator 123, and/or the registration service 124.

In an embodiment, the device that executes the indexer is the server 120. In an embodiment, the server 120 is a cloud processing environment.

At 210, the indexer identifies a biometric template for a user engaged in a transaction at a transaction terminal.

In an embodiment, at 211, the indexer receives the template from a biometric agent that processed biometric data captured for the user during the transaction at the transaction terminal.

In an embodiment, at 212, the indexer generates the biometric template from biometric data captured at the transaction terminal during the transaction.

At 220, the indexer searches an index with the biometric template to obtain a token (a GUID) for the user and a link to an external service.

In an embodiment, at 221, the indexer maintains the index as records without any personal or confidential data of the user being retained within the records. Here, when a user no longer desires to participate in the cross-authentication and cross-account access services of the indexer, the templates are simply deleted from the index and there is no concern of exposes the user's personal data online.

In an embodiment, at 222, the indexer maintains the index as having multiple records for the user, each record including a unique template, the token, and the link.

In an embodiment of 222 and at 223, the indexer associates each unique template as being linked to a particular type of biometric data (e.g., facial image, fingerprint readings, iris scan readings, voice patterns, etc.). As such, a user can have multiple different biometric templates.

At 230, the indexer provides the token and to the external service utilizing the link.

In an embodiment, at 231, the indexer utilizes with the link a unique identifier for the user that the external service identifies with an account of the user. The unique identifier obtained from the index at 220.

In an embodiment, at 232, the indexer processes the link with credentials of the user for the external service and the indexer logs into the external service as the user with the credentials obtained from the index at 220. The credentials within the index can be encrypted and decrypted by the indexer before use.

In an embodiment, at 233, the indexer provides the external service an authentication security assertion (e.g., SAML, OATH, etc.) with the ink, which authenticates the indexer to the external service. The token included in an account associated with the user, and the external service permitting access to the account based on the authentication security assertion and the token.

At 240, the indexer obtains personal data associated with the user from the external service for processing during the transaction being conducted by the user at the transaction terminal. Here, the specific type of data requested of the external service may be provided through an API to the external service with the link (modified for the specific personal data request).

In an embodiment, at 241, the indexer provides the personal data to a requesting transaction manager that is processing the transaction on the transaction terminal.

According to an embodiment, at 250, the indexer registers the biometric template prior to and before the transaction is processed during a registration session with the user. This was discussed at length with the FIG. 1 and the registration service 124.

In an embodiment of 250 and at 251, the indexer provides the token during the registration session to the external service for updating an account of the user with the external service. This allows the external service to identify the user's account at 230 and 240. Other mechanism for this were also discussed above with the FIG. 1 and can be included in other embodiments.

Figure 3:
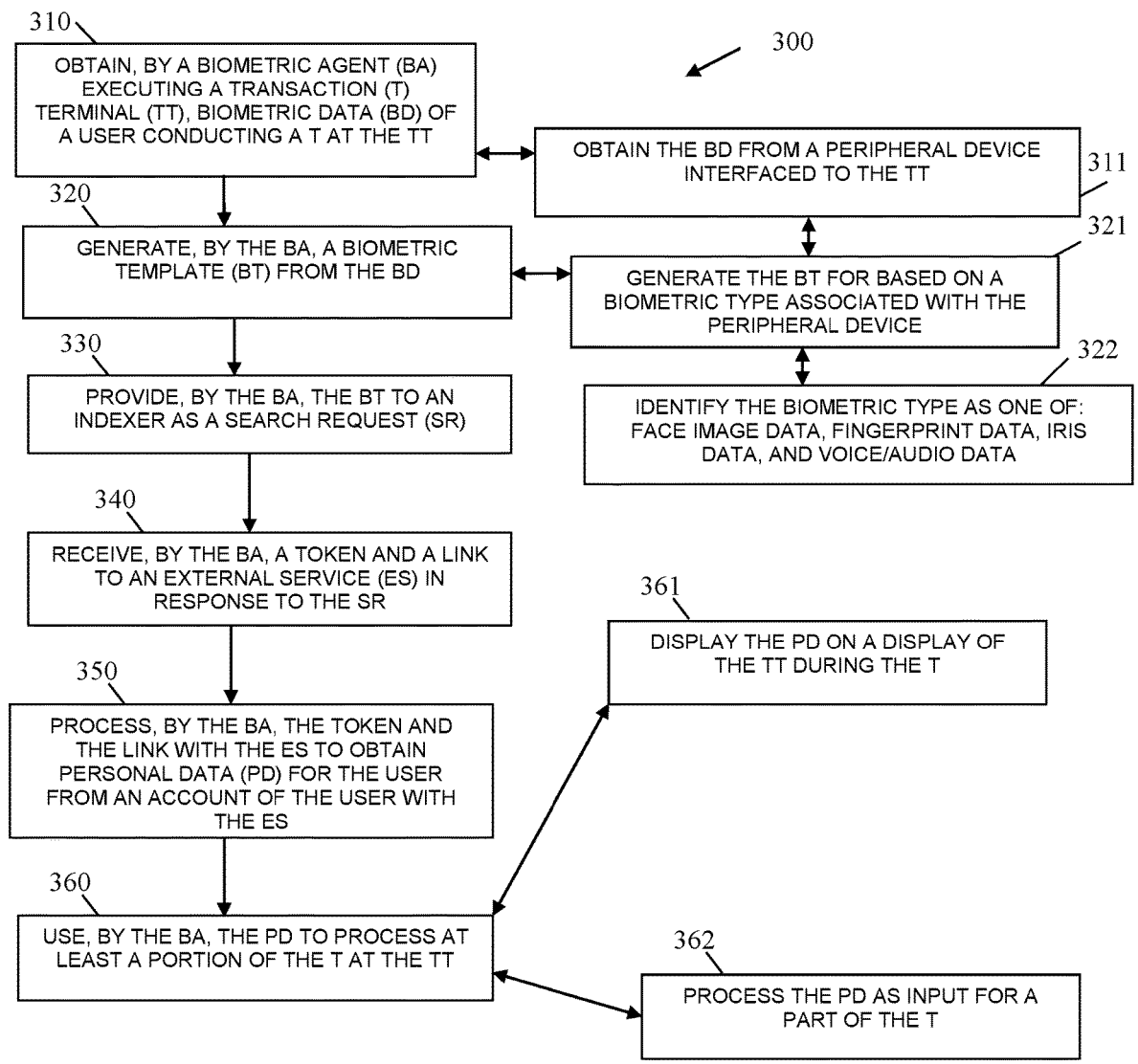
FIG. 3 is a diagram of another method for biometric index linking and processing, according to an example embodiment.

FIG. 3 is a diagram of another method 300 for biometric index linking and processing, according to an example embodiment. The software module(s) that implement the method 300 is referred to herein as a "biometric agent." The biometric agent is implemented as executable instructions and programmed within memory and/or a non-transitory computer-readable (processor-readable) storage medium that executes on one or more processors of a device. The processors of the device are specifically configured to execute the biometric agent. The biometric agent has access one or more networks; the networks are wireless.

In an embodiment, the biometric agent is all or some combination of the biometric agent 112 and/or the transaction manager 113.

In an embodiment, the device that executes the biometric agent is the transaction terminal 110. In an embodiment, the transaction terminal 110 is one of: a phone, a tablet, a wearable processing device, a POS terminal, a SST, a kiosk, and an ATM.

At 310, the biometric agent obtains biometric data of a user conducting a transaction at a transaction terminal.

In an embodiment, at 311, the biometric agent obtains the biometric data from a peripheral device interfaced to the transaction terminal.

At 320, the biometric agent generates a biometric template from the biometric data.

In an embodiment of 311 and 320, at 321, the biometric agent generates the biometric template based on a biometric data type associated with the peripheral device (based on the type of data that the peripheral device is designed to capture).

In an embodiment of 321 and at 322, the biometric agent identifies the biometric data type as one of: a face data, a fingerprint data, a iris data, and voice/audio data.

At 330, the biometric agent provides the biometric template to an indexer as a search request.

At 340, the biometric agent receives a token and a link to an external service in response to results returned by indexer to the search at 330.

At 350, the biometric agent process the token and the link with the external service to obtain personal data for the user from an account of the user maintained and controlled by the external service.

At 360, the biometric agent uses the personal data to process at least a portion of the transaction at the transaction terminal.

In an embodiment, at 361, the biometric agent displays the personal data on a display of the transaction terminal during the transaction and as part of the transaction processing.

In an embodiment, at 362, the biometric agent processes the personal data as input for a part of the transaction.

Figure 4:
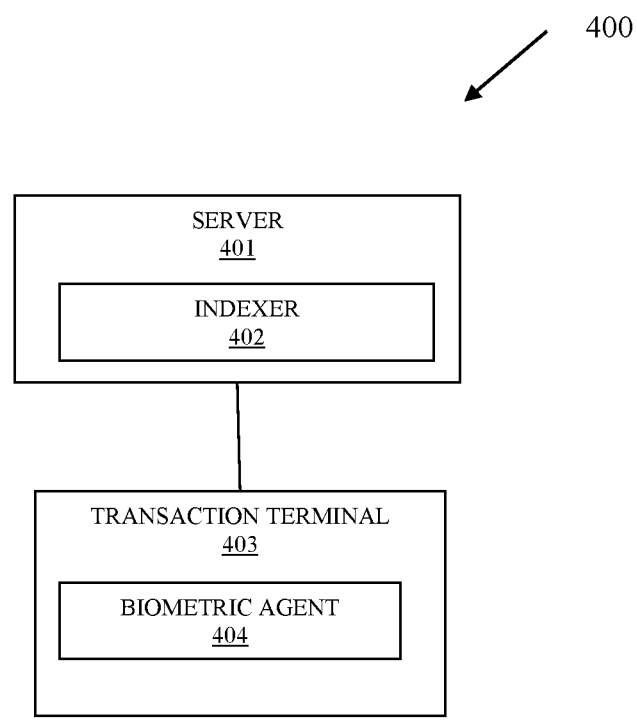
FIG. 4 is a diagram of another system for biometric index linking and processing, according to an example embodiment.

FIG. 4 is a diagram of a system 400 for biometric index linking and processing, according to an example embodiment. Some components of the system 400 are programmed and reside within memory and/or a non-transitory computer-readable medium and execute on one or more processors of devices of the system 400. The system 400 also has access and can communicate over one or more networks; and the networks are wireless, wired, or a combination of wired and wireless.

The system 400 is configured and programed to perform the processing discussed above with the FIGS. 1-3.

The system 400 includes a server 401 having an indexer 402 and a transaction terminal 403 having a biometric agent 404.

In an embodiment, the server 401 is the server 120. In an embodiment, the server 120 is part of a cloud processing environment.

In an embodiment, the indexer 402 is all or some combination of one or more of: the indexer 121, the token generator 123, the registration service 124 and/or the method 200.

In an embodiment, the transaction terminal 403 is the device 110. In an embodiment, the device 110 is one of: a phone, a tablet, a wearable processing device, a laptop, a desktop computer, a server, a POS terminal, a SST, a kiosk, and an ATM.

In an embodiment, the biometric agent 404 is all or some combination of one or more of: the biometric agent 112, the transaction manager 113, and/or the method 300.

The server 401 includes at least one hardware processor configured for executing executable instructions representing the indexer 402.

The transaction terminal 403 includes at least one hardware processor configured for executing executable instructions representing the biometric agent 404.

The biometric agent 404 executes on at least one hardware processor of the transaction terminal 403 and is configured to: (i) generate a biometric template from biometric data captured for a user during a transaction at the transaction terminal 403, (ii) provide the biometric template to the indexer 402 as a search request, (iii) process the transaction with personal data of the user obtained from an external service having an account of the user based on making the search request to the indexer 402.

The indexer 402 executes on at least one hardware processor of the server 401 and is configured to: (i) receive the search request from the biometric agent 404, (ii) search an index with the biometric template and obtain a token and a link to the external service, and (iii) cause the external service to access the account and provide the personal data to the biometric agent 404 for processing the transaction based at least in part on the token.

It should be appreciated that where software is described in a particular form (such as a component or module) this is merely to aid understanding and is not intended to limit how software that implements those functions may be architected or structured. For example, modules may be illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors of a single device, or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method, comprising: identifying a biometric template for a user; searching an index with the biometric template to obtain a token that identifies the user and a link to an external service;
   providing the token to the external service utilizing the link, providing the external service an authentication security assertion with the link, the authentication security assertion authenticates the indexer to the external service, the token included in an account associated with the user and the external service permitting access to the account based on the authentication security assertion and
   the token: and
   obtain personal data associated with the user from the external service for processing during a transaction by the user at a transaction terminal.

2. The method of claim 1 further comprising, registering the biometric template before the transaction during a registration session with the user.

3. The method of claim 2, wherein registering further includes providing the token during the registration session to the external service for updating to the account of the user with the external service.

4. The method of claim 1, wherein identifying further includes receiving the biometric template from a biometric agent that processes biometric data captured for the user during the transaction at the transaction terminal.

5. The method of claim 1, wherein identifying further includes generating the biometric template from biometric data captured at the transaction terminal during the transaction.

6. The method of claim 1, wherein searching further includes maintaining the index as records without any personal data of the user.

7. The method of claim 1, searching further includes maintaining the index as having multiple records for the user, each record including a unique template, a unique token, and the link.

8. The method of claim 7, wherein maintaining further includes associating each unique template as being linked to a particular type of biometric data.

9. The method of claim 1, wherein providing further includes utilizing with the link a unique identifier for the user that the external service identifies with the account of the user, the unique identifier obtained from the index with the searching.

10. The method of claim 1, wherein providing further includes processing the link with credentials of the user for the external service to log into the external service as the user, the credentials obtained from the index with the searching.

11. The method of claim 1, wherein obtaining further includes providing the personal data to a requesting transaction manager that is processing the transaction on the transaction terminal.

12. A system, comprising:
   a server having executable instructions that execute on at least one hardware processor of the server, the executable instructions representing an indexer; and
   a transaction terminal having executable instructions that execute on at least one hardware processor of the transaction terminal, the executable instructions representing a biometric agent;
   wherein the biometric agent is configured to: (i) generate a biometric template from biometric data captured for a user during a transaction at the transaction terminal, (ii) provide the biometric template to the indexer as a search request, (iii) process the transaction with personal data of the user obtained from an external service having an account of the user based on making the search request to the indexer;
   wherein the indexer is configured to: (i) receive the search request from the biometric agent, (ii) search an index with the biometric template and obtain a token and a link to the external service, and (iii) cause the external service to access the account and provide the personal data to the biometric agent for processing the transaction based at least in part on the token by providing the external service an authentication security assertion with the link, the authentication security assertion authenticates the indexer to the external service, the token included in an account associated with the user and the external service permitting access to the account based on the authentication security assertion and the token.

13. The system of claim 12, wherein the transaction terminal is one of: a phone, a wearable processing device, a desktop computer, a server, a tablet, a Point-Of-Sale (POS) terminal, a Self-Service Terminal (SST), a kiosk, and an Automated Teller Machine (ATM).

* * * * *